(12) United States Patent
Stanley et al.

(10) Patent No.: US 8,202,045 B2
(45) Date of Patent: Jun. 19, 2012

(54) BLOWER FAN FOR LOW PROFILE ENVIRONMENT

(75) Inventors: Gavin D. Stanley, Puyallup, WA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 12/146,680

(22) Filed: Jun. 26, 2008

(65) Prior Publication Data

US 2009/0324411 A1 Dec. 31, 2009

(51) Int. Cl.
*F01D 5/08* (2006.01)
*F01D 5/18* (2006.01)
*F01D 25/08* (2006.01)
*F04D 29/58* (2006.01)

(52) U.S. Cl. ....... 415/178; 415/119; 415/177; 165/80.3; 165/121; 165/185

(58) Field of Classification Search .................. 415/119, 415/184, 177, 178; 165/121, 185
See application file for complete search history.

(56) References Cited

U.S. PATENT DOCUMENTS

| 5,309,983 | A | * | 5/1994 | Bailey | 165/80.3 |
| 5,509,465 | A | * | 4/1996 | Lai | 165/80.3 |
| 6,047,765 | A | * | 4/2000 | Zhan | 165/80.3 |
| 6,459,580 | B1 | * | 10/2002 | Della Fiora et al. | 361/697 |
| 2007/0204629 | A1 | * | 9/2007 | Lofy | 62/3.61 |

* cited by examiner

*Primary Examiner* — David Nhu
(74) *Attorney, Agent, or Firm* — Buckley, Maschoff & Talwalkar LLC

(57) ABSTRACT

According to some embodiments, a method and system are provided to receive an airflow at a blower fan via an axial fan, and expel the airflow via a blower fan. The blower fan comprises a hub associated with an axis of rotation, and the axial fan comprises the hub.

16 Claims, 4 Drawing Sheets

700

Receive an airflow at a blower fan via an axial fan
701

Expel the airflow via a blower fan, where the blower fan comprises a hub at an axis of rotation, and where the axial fan comprises the hub
702

US 8,202,045 B2

BLOWER FAN FOR LOW PROFILE ENVIRONMENT

BACKGROUND

As computer systems continue to become smaller and have lower profiles (i.e., a smaller physical size), generation of airflow and pressure necessary to cool electronics contained therein becomes more difficult. Conventional blower fans have been used to cool computer electronics. Blower fans traditionally develop dynamic pressure via an increase in angular speed of their spinning blade array. This dynamic pressure is then converted to static pressure in a diffusion section outside a rotating or spinning wheel that is coupled to the array in a volute or involute.

When a blower fan is placed in a low profile system, where air cannot enter an intake to the blower fan in the same direction of the axis of rotation of the blower fan, a pressure drop may impede the intake and thus may reduce the blower fan's effectiveness. Current blower fan designs combat increases in intake impedance by increasing the blower fan speed, which may increase acoustic noise associated with the blower fan.

Some manufacturers have employed axial fans to cool computer electronics. However, axial fans fail to generate adequate airflow and pressure for prolonged cooling, particularly when sandwiched between circuit board cards that axially constrain airflow at an inlet and an outlet of the axial fan.

DETAILED DESCRIPTION

Figure 1:
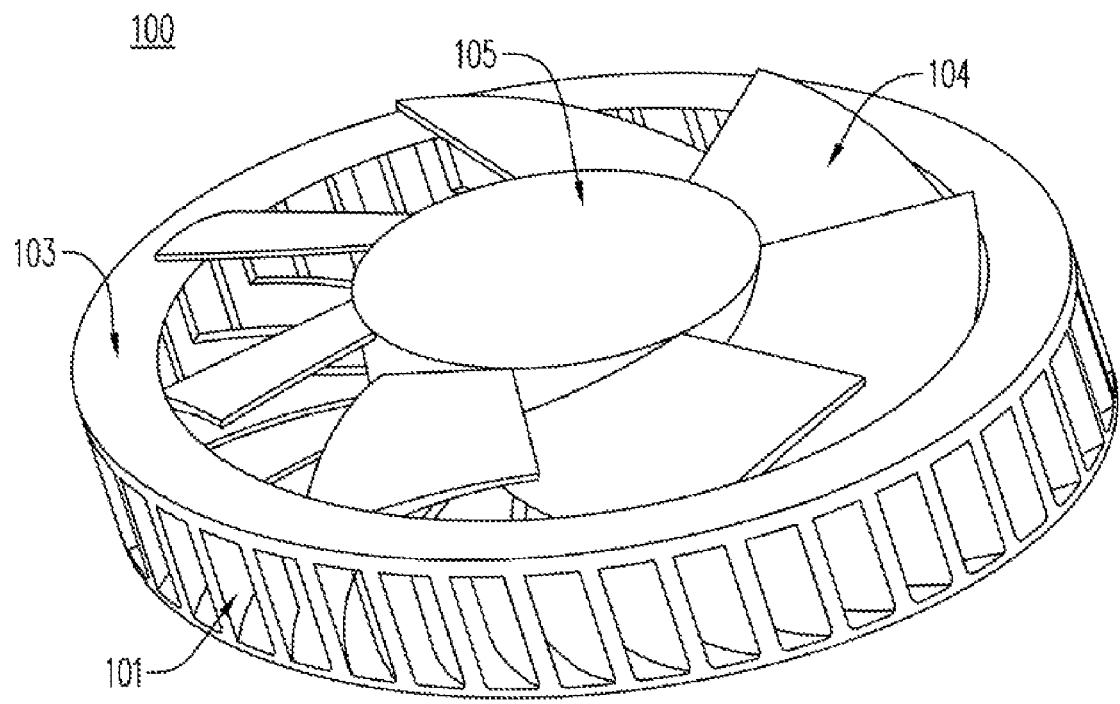
FIG. 1 illustrates a perspective view of a blower fan according to some embodiments.
Figure 2:
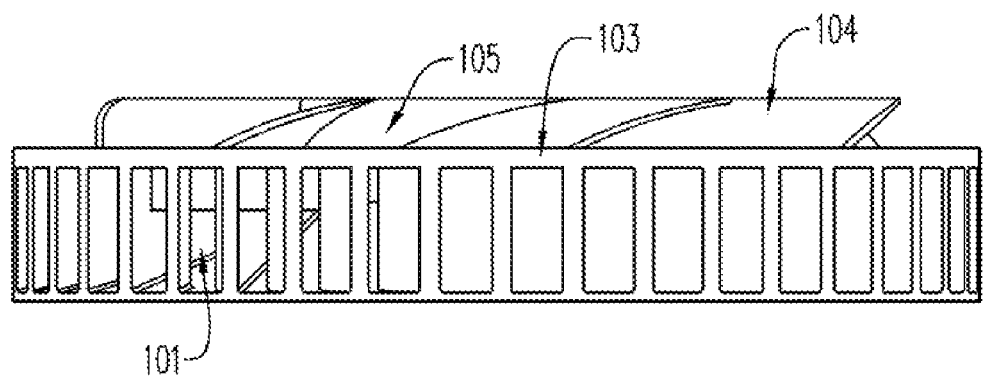
FIG. 2 illustrates a side view of a blower fan according to some embodiments.

Referring now to FIG. 1 and FIG. 2, an embodiment of a blower fan 100 is shown. The blower fan 100 may comprise a blower wheel 103, and a hub 105. The blower wheel 103 may comprise a plurality of blower blades 101. The hub 105 may be associated with or positioned in accordance with an axis of rotation and the blower wheel 103 may rotate or spin around the axis of rotation.

Figure 6:
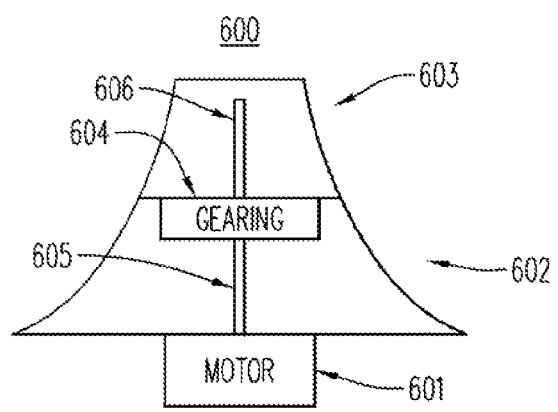
FIG. 6 illustrates a hub according to some embodiments.

The hub 105 may be coupled to a motor (as shown in FIG. 6) that powers the blower fan 100. The motor may turn the hub 105 to spin the blower wheel 103, and the blower blades 101.

The plurality of blower blades 101 may be coupled to the hub 105. When the blower wheel 103 spins, the plurality of blower blades 101 may generate an airflow and may move the airflow through the blower blades 101, thus expelling the airflow from the blower fan 100. The blower blades fins 101 may act as guides to direct the expelled airflow away from the blower fan 100.

The hub 105 may also be coupled to a plurality of fan blades 104. The plurality of fan blades 104 may be placed at an intake of the blower blades 101 and may move air into the blower fan 100. In some embodiments, the combination of the plurality of fan blades 104 and the hub 105 may comprise an axial fan. Each of the plurality of fan blades 104 may comprise a high chamber airfoil shaped blade that is forward swept. For example, the plurality of fan blades 104 may conform to a National Advisory Committee for Aeronautics ("NACA") 6404 fan blade geometry at a thirty-degree angle. Pressures that are developed by this fan blade geometry (e.g., NACA 6404 at 30 degree angle and forward swept) may generate an inward radial airflow and thus may improve airflow into the blower fan 100. In this sense, the plurality of fan blades 104 may act as inducers for the blower fan 100 by increasing an upstream static pressure before the intake of the blower blades 101. Therefore, by increasing upstream static pressure before the intake to the blower blades 101, the plurality of fan blades 104 may effectively decrease an impedance of airflow into the blower fan 100.

Figure 3:
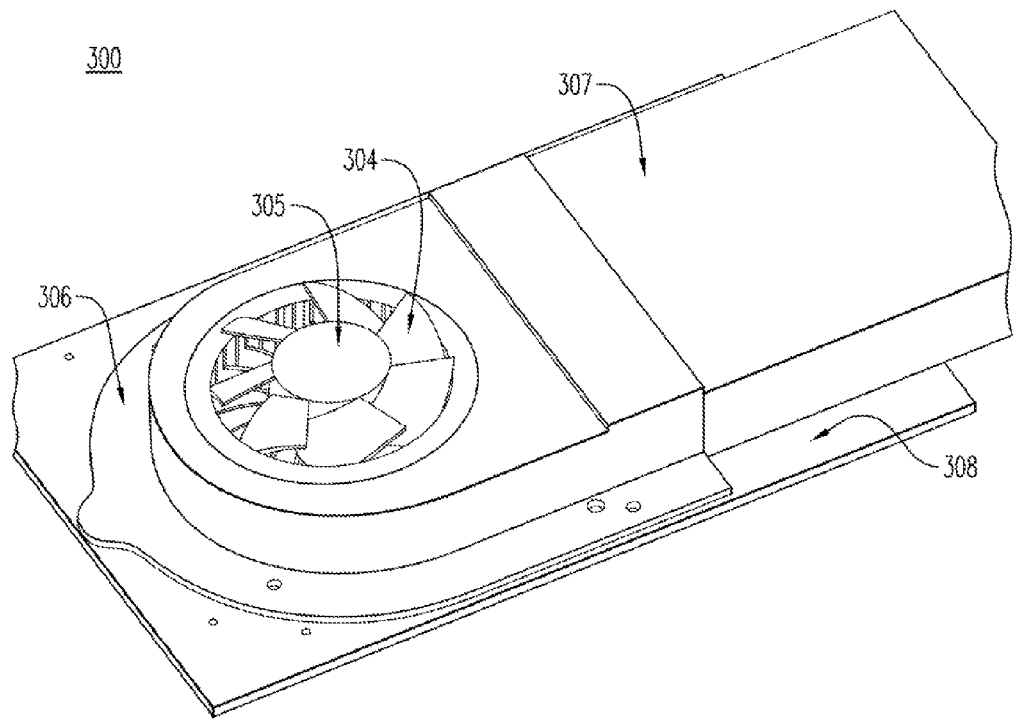
FIG. 3 illustrates a perspective view of a system according to some embodiments.
Figure 4:
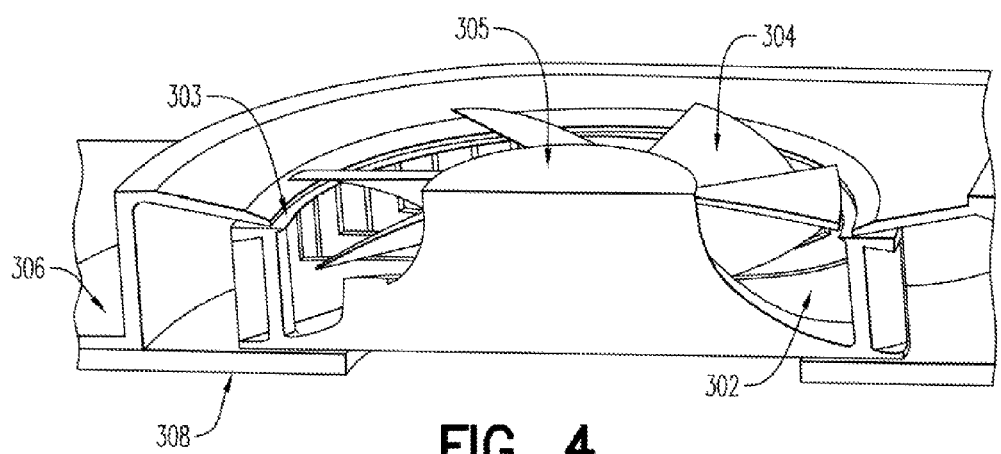
FIG. 4 illustrates a cross sectional view of a system according to some embodiments.

Now referring to FIG. 3 and FIG. 4, an embodiment of a system 300 is shown. A blower fan, such as blower fan 100, may be enclosed in a case 306 to direct an airflow towards a heat sink 307. The enclosed blower fan may comprise a blower wheel 303 and a hub 305. The blower wheel 303 may comprise a plurality of blower blades 302 which correspond to similarly-named elements of FIG. 1 and FIG. 2. A plurality of fan blades 304 may be coupled to the hub 305 where the plurality of fan blades 304 correspond to similarly-named element 104 of FIG. 1.

The enclosed blower fan and the heat sink 307 may be coupled to a circuit board 308. In some embodiments, the heat sink 307 may also be coupled to a heat-generating element (not shown), such as, but not limited to, a processor, or a graphics processor.

Figure 5:
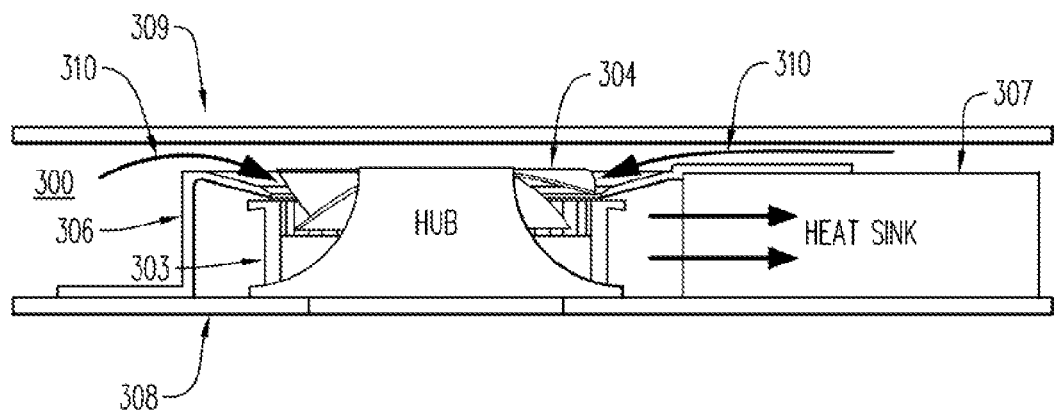
FIG. 5 illustrates a cross sectional view of a system according to some embodiments.

FIG. 5 illustrates an embodiment showing airflow 310 associated with system 300. As illustrated, the system 300 may comprise the first circuit board 308 and a second circuit board 309 where the enclosed blower fan and heat sink 307 are disposed between the first circuit board 308 and the second circuit board 309. In some embodiments, the first circuit board 308 may comprise a two-slot graphics card and thus a distance between the first circuit board 308 and the second circuit board 309 may be equivalent to 2 slots as known in the art. For example, the circuit boards 308 and 309 may comprise a graphics system requiring space equaling two card slots, such as two PCIe card slots, or any known computer card slots which may be used to connect a peripheral to a computer system.

As shown, the plurality of fan blades 304 may facilitate entry of an airflow 310 into a blower fan from a direction substantially perpendicular to an axis of rotation of the blower fan. The plurality of fan blades 304 thereby reduce an impedance that would otherwise be presented to airflow 310 at an entry of the blower fan. The airflow 310 may then be expelled from the blower fan to facilitate heat removal from the heat sink 307.

An embodiment of a hub 600 is illustrated at FIG. 6 according to some embodiments. The hub 600 may comprise a top portion 603 and a bottom portion 602. The top portion 603 may be coupled to a plurality of blades of an axial fan and the bottom portion 602 may be coupled to a plurality of blades of a blower wheel as described above. In some embodiments the top portion 603 and the bottom portion 602 may spin at a same speed. However, in some embodiments the top portion 603, and the bottom portion 602 may spin at different speeds, which may allow a system to optimize a desired amount of airflow. By turning each portion at a different speed, an amount of air sent to an intake of a blower fan may be adjusted to maximize a quantity of airflow that is expelled. As illustrated, the hub 600 may be coupled to a motor 601 comprising a first shaft 605, a second shaft 606 and an external gearing unit 604. The motor 601 may spin the bottom portion 602 at a first speed via the first shaft 605. The first shaft 605 may power the gearing unit 604 to spin the second shaft 606 at a second speed.

In some embodiments, the bottom portion 602 may spin in a first direction and the top portion 602 may spin in a second direction via the gearing unit 604. In some embodiments, instead of having a single motor 601 and a gearing unit, the hub 600 may be coupled to a first motor 601 and a second motor (not shown).

Figure 7:
FIG. 7 illustrates a process according to some embodiments.

Now referring to FIG. 7, an embodiment of a method 700 is illustrated. Some embodiments of method 700 may be performed by a system, such as, but not limited to, system 300 of FIG. 3 or by an apparatus such as, but not limited to, blower fan 100 of FIG. 1. Some embodiments of method 700 may augment a pressure capability of a blower fan.

At 701, an airflow is received at a blower fan via an axial fan. The airflow may be pulled into the blower fan via a plurality of fan blades such as fan blades 304. In some embodiments, the axial fan may spin in a first direction (e.g. counter clockwise) and the blower fan may spin in a second direction (e.g. clockwise). However, the axial fan and the blower fan may spin in a same direction according to some embodiments.

In some embodiments, the axial fan may spin at a first speed and the blower fan may spin at a second speed. The first speed and the second speed may be adjusted to optimize an amount of air that enters a blower fan intake where the first speed may be slower than the second speed.

Next, at 702, the airflow is expelled via a blower fan, where the blower fan comprises a hub associated with an axis of rotation, and wherein the axial fan comprises the hub.

Various modifications and changes may be made to the foregoing embodiments without departing from the broader spirit and scope set forth in the appended claims.

What is claimed is:

1. An apparatus comprising:
 a blower fan comprising a hub, the hub associated with an axis of rotation; and
 an axial fan comprising the hub, wherein the apparatus is coupled to a heat sink and a multi-slot graphics card.

2. The apparatus of claim 1, wherein the blower fan further comprises a blower wheel coupled to the hub, the blower wheel comprising a plurality of blower blades, wherein the plurality of blower blades are to move air exterior to the blower wheel.

3. The apparatus of claim 1, wherein the axial fan comprises a plurality of fan blades coupled to the hub, wherein the plurality of fan blades is to move air to the blower fan.

4. The apparatus of claim 3, wherein the plurality of fan blades are forward swept and conform to a National Advisory Committee for Aeronautics ("NACA") 6404 fan blade geometry at a thirty degree angle.

5. The apparatus of claim 1, wherein the blower fan is to spin in a first direction and wherein the axial fan is to spin in a second direction.

6. The apparatus of claim 1, wherein the blower fan is to spin at a first speed and wherein the axial fan is to spin at a second speed.

7. The apparatus of claim 1, further comprising a motor to turn the blower fan and the axial fan.

8. A method associated with a blow fan for a low-profile environment, comprising:
 receiving an airflow at a blower fan via an axial fan; and
 expelling the airflow via the blower fan, wherein the blower fan comprises a hub associated with an axis of rotation, and wherein the axial fan comprises the hub, and further wherein the blower fan comprises a blower wheel coupled to the hub, the blower wheel comprising a plurality of blower blades coupled to the hub, and the plurality of blower blades are to move air exterior to the blower wheel.

9. The method of claim 8, wherein the axial fan comprises a plurality of fan blades coupled to the hub, wherein the plurality of fan blades is to move air inward to the blower fan.

10. The method of claim 9, wherein the plurality of fan blades are forward swept and conform to a National Advisory Committee for Aeronautics ("NACA 6404") fan blade geometry at a thirty degree angle.

11. The method of claim 8, wherein the apparatus is coupled to a heat sink and a printed circuit board.

12. The method of claim 11, wherein the printed circuit board is a two-slot graphics card.

13. A method associated with a blow fan for a low-profile environment, comprising:
 receiving an airflow at a blower fan via an axial fan; and
 expelling the airflow via the blower fan, wherein the blower fan comprises a hub associated with an axis of rotation, and wherein the axial fan comprises the hub, wherein the axial fan comprises a plurality of fan blades coupled to the hub to move air inward to the blower fan.

14. The method of claim 13, wherein the plurality of fan blades are forward swept and conform to a National Advisory Committee for Aeronautics ("NACA") 6404 fan blade geometry at a thirty degree angle.

15. The method of claim 13, wherein the apparatus is coupled to a heat sink and a printed circuit board.

16. The method of claim 15, wherein the printed circuit board is a two-slot graphics card.

\* \* \* \* \*